US009605709B2

(12) United States Patent
Kaesler et al.

(10) Patent No.: US 9,605,709 B2
(45) Date of Patent: Mar. 28, 2017

(54) CYLINDRICAL ROLLER BEARING

(71) Applicant: THYSSENKRUPP ROTHE ERDE GMBH, Dortmund (DE)

(72) Inventors: Andreas Kaesler, Erwitte (DE); Thomas Malzer, Werl (DE)

(73) Assignee: THYSSENKRUPP ROTHE ERDE GMBH, Dortmund (DE)

( * ) Notice: Subject to any disclaimer, the term of this patent is extended or adjusted under 35 U.S.C. 154(b) by 0 days.

(21) Appl. No.: 14/762,679

(22) PCT Filed: Jan. 6, 2014

(86) PCT No.: PCT/EP2014/050100
§ 371 (c)(1),
(2) Date: Jul. 22, 2015

(87) PCT Pub. No.: WO2014/114477
PCT Pub. Date: Jul. 31, 2014

(65) Prior Publication Data
US 2015/0362009 A1 Dec. 17, 2015

(30) Foreign Application Priority Data
Jan. 23, 2013 (DE) .................. 10 2013 100 679

(51) Int. Cl.
*F16C 19/38* (2006.01)
*F16C 33/66* (2006.01)
(Continued)

(52) U.S. Cl.
CPC ........ *F16C 19/381* (2013.01); *F16C 33/6659* (2013.01); *F16C 19/56* (2013.01); *F16C 2300/14* (2013.01)

(58) Field of Classification Search
CPC ........ F16C 19/34; F16C 19/38; F16C 33/583; F16C 33/60; F16C 33/6659; F16C 2300/14; F16C 19/56
(Continued)

(56) References Cited

U.S. PATENT DOCUMENTS 4,126,361 A * 11/1978 Bottner .................. E02F 9/121
384/455
4,161,344 A * 7/1979 Delarbre ................. B66C 23/84
384/593
(Continued)

FOREIGN PATENT DOCUMENTS

DE  1 179 052 B  10/1964
DE  74 04 405 U  5/1974
(Continued)

OTHER PUBLICATIONS

German language International Search Report for International patent application No. PCT/EP2014/050100; mailing date Apr. 2, 2014.
(Continued)

*Primary Examiner* — Marcus Charles
(74) *Attorney, Agent, or Firm* — thyssenkrupp North America, Inc.

(57) ABSTRACT

Disclosed is a cylindrical roller bearing for absorbing axial and radial forces. The roller bearing includes a first bearing ring and a second bearing ring, which are arranged concentrically about an axis of rotation extending in an axial direction. The second bearing ring has a groove, which is open in a radial direction and in which a projection of the first bearing ring engages. The roller bearing further includes a first radial bearing row and two axial bearing rows spaced in the axial direction that are arranged between the projection and the groove, wherein the first radial bearing row supports the first bearing ring against the second bearing (Continued)

ring in a first radial direction. The roller bearing also includes a second radial bearing row that supports the first bearing ring against the second bearing ring in a second radial direction that is opposite to the first radial direction. The first bearing ring is divided in the axial direction into at least one first ring part having the projection and one second ring part, wherein the second radial bearing row is arranged between the second ring part and the second bearing ring at an axial distance from the projection.

10 Claims, 3 Drawing Sheets

(51) Int. Cl.
*F16C 33/58* (2006.01)
*F16C 19/56* (2006.01)

(58) Field of Classification Search
USPC ....... 384/454, 455, 456, 559, 565, 570, 577, 384/585, 579, 606, 619, 622
See application file for complete search history.

(56) References Cited

U.S. PATENT DOCUMENTS

| | | | | |
|---|---|---|---|---|
| 4,413,866 A | * | 11/1983 | Geisey | F16C 19/30 384/572 |
| 4,422,697 A | | 12/1983 | Schaeffler | |
| 4,573,811 A | * | 3/1986 | Andree | F16C 19/181 384/622 |
| 4,861,171 A | * | 8/1989 | Adachi | F16H 57/021 384/455 |
| 4,989,999 A | * | 2/1991 | Siemensmeyer | F16C 19/381 384/455 |
| 5,074,677 A | * | 12/1991 | Andree | B66C 23/84 384/448 |
| 2008/0169257 A1 | | 7/2008 | Roodenburg et al. | |
| 2009/0208160 A1 | * | 8/2009 | Wolf | F16C 19/49 384/477 |
| 2010/0044331 A1 | * | 2/2010 | Roodenburg | F16C 33/60 212/253 |
| 2010/0316322 A1 | * | 12/2010 | Derrer | F16C 19/505 384/571 |

FOREIGN PATENT DOCUMENTS

| | | |
|---|---|---|
| DE | 3034008 C2 | 12/1987 |
| DE | 10 2006 012 785 A1 | 9/2007 |
| DE | 10 2008 035 003 A1 | 2/2010 |
| DE | 102011000769 A1 | 8/2012 |
| EP | 0413119 B1 | 5/1993 |
| EP | 2092204 B1 | 8/2012 |
| GB | WO 2007112748 A2 * 10/2007 ........... F03D 7/0224 |
| WO | 2008058729 A1 | 5/2008 |

OTHER PUBLICATIONS

English translation of International Search Report for International patent application No. PCT/EP2014/050100; mailing date Apr. 2, 2014.
Erich Hau, "Windkraftanlagen—Grundlagen, Technik, Einsatz, Wirtschaftlichkeit" ["Wind Turbines—Fundamental Principles, Technologies, Application, Economics"], 2nd Edition, 1996, pp. 233-234.
English translation of abstract of DE 102011000769 A1.
English translation of abstract of EP 0413119 B1.
English language Abstract of DE 10 2008 035 003 A1 listed above.
English language Abstract of DE 10 2006 012 785 A1 listed above.

* cited by examiner

CYLINDRICAL ROLLER BEARING

CROSS REFERENCE TO RELATED APPLICATIONS

This application is a U.S. National Stage Entry of International Patent Application Serial Number PCT/EP2014/050100, filed Jan. 6, 2014, which claims priority to German patent application no. DE 102013100679.5 filed Jan. 23, 2013, the entire contents of both of which are incorporated herein by reference.

FIELD

The invention relates to a cylindrical roller bearing for absorbing axial and radial forces, having a first bearing ring and having a second bearing ring which are arranged concentrically about an axis of rotation running in an axial direction, wherein the second bearing ring has a groove which is open in a radial direction and into which a lobe of the first bearing ring engages, wherein, between the lobe and the groove, there are arranged a first radial bearing row and two axial bearing rows which are spaced apart in the axial direction, wherein the first radial bearing row supports the first bearing ring in a first radial direction against the second bearing ring, and wherein a second bearing row is provided which supports the first bearing ring relative to the second bearing ring in a second radial direction which is opposite to the first radial direction. The cylindrical roller bearing is in particular in the form of a combined axial-radial bearing for the mounting of rotor blades on a wind turbine. Corresponding rolling bearings are in practice also referred to as blade adjustment bearings.

BACKGROUND

Known wind turbines, in their conventional construction, have a tower, on the upper end of which a generator with a generator housing is arranged. A rotor, which typically bears three rotor blades, is connected to the generator directly or via a transmission. To adapt the position of the rotor blades to different wind speeds, the rotor blades are attached to the rotor so as to be rotatable about a rotor blade longitudinal axis. For this purpose, axial-radial large rolling bearings are used as blade adjustment bearings (Erich Hau, "Windkraftanlagen—Grundlagen, Technik, Einsatz, Wirtschaftlichkeit" ["Wind Turbines—Fundamental Principles, Technologies, Application, Economics"], $2^{nd}$ Edition, 1996, pages 233-234). It is the object of said bearings and of an associated adjustment arrangement to adapt the angle of incidence of the associated rotor blade to the respective wind speed and/or to the operating state of the turbine.

DE 10 2011 000 769 A1 has disclosed an axial-radial rolling bearing which is suitable in particular for the mounting of rotor blades on a wind turbine and which, while being of compact design, is characterized by a high load-bearing capacity. For radial support, a radial bearing row is arranged in the conventional manner between an inner ring and an outer ring.

With regard to the radial support, cylindrical roller bearings of similar construction are known from DE 30 34 008 C2 and from EP 0 413 119 B1. The radial mounting is realized by way of a radial bearing row which is arranged between an inner ring and an outer ring. One of the bearing rings comprises a groove which is open in a radial direction. If this is the outer ring, the groove is open in the inward radial direction toward the axis of rotation. By contrast, if the inner ring is provided with the groove, said groove is open in the outward radial direction. The respective other bearing ring has a lobe which engages into the groove. Such a ring is in practice also referred to as lobe ring. The first radial bearing row is arranged on a radially encircling tip of the lobe, whereas two axial bearing rows which are spaced apart in an axial direction are provided on the lateral flanks of the lobe. In the case of such a construction, the inner ring is supported in the outward direction against the outer ring by way of the radial bearing row.

Depending on the use of the cylindrical roller bearing, considerable forces may arise, which may to a certain extent also cause a deformation of the bearing and/or of the interacting bearing rings. Specifically in the case of blade adjustment bearings, it is possible, if the connecting structure is of inadequate rigidity, for the forces that occur during operation to elastically deform the bearing rings such that they no longer have a circular shape. This deformation which occurs under load is also referred to as ovalization. In the case of a conventional cylindrical roller bearing with only one radial bearing row, such a deformation may cause the inner ring to locally move away from the outer ring, such that at said circumferential section, the cylindrical rollers as rolling bodies no longer contribute to a supporting action, whereas increased distortion and compressive loads arise in other regions of the circumference.

In order to realize a more uniform force distribution and counteract the described deformation of the bearing rings, a cylindrical roller bearing as disclosed in EP 2 092 204 B1 was developed. One of the two bearing rings comprises a lobe ring, wherein the other bearing ring has a projection which engages around the lobe ring. This permits a design in which the lobe ring is guided not only in the axial direction but also in the radial direction by in each case two opposite rows of cylindrical rollers. Owing to the bilateral guidance, the rings can no longer be deformed differently to one another in a radial direction, such that the overall construction is characterized by an increased strength, wherein the bearing rings also cannot regionally move away from one another in the radial direction.

It is however a disadvantage that, in particular in the radial direction, a considerable amount of installation space is required for the arrangement of the lobe ring.

Against this background, the problem addressed by the present invention is that of specifying a cylindrical roller bearing in which different deformation of the interacting bearing rings in a radial direction is avoided, while at the same time a compact design is realized.

BRIEF DESCRIPTION OF THE DRAWINGS

The present disclosure is described in detail below with reference to the attached drawing figures, wherein.

DETAILED DESCRIPTION

Figure 1:
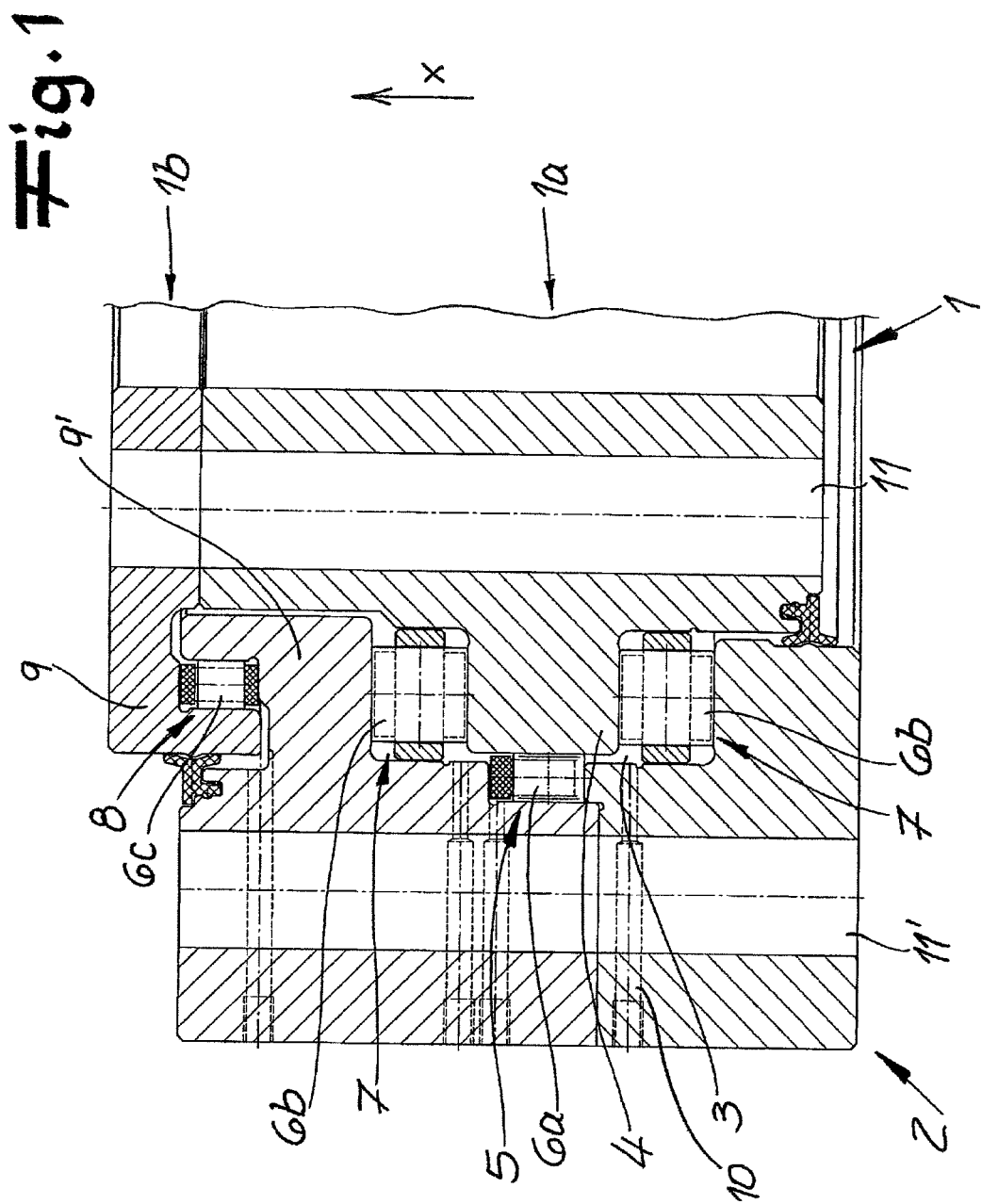
FIG. 1 is a partial cross section view of an embodiment of a cylindrical roller bearing of the present disclosure.

The invention thus relates to a cylindrical roller bearing, in particular a large rolling bearing for the mounting of rotor blades, for absorbing axial and radial forces, having a first bearing ring and having a second bearing ring which are arranged concentrically about an axis of rotation running in an axial direction, wherein the second bearing ring has a groove which is open in a radial direction. The first bearing ring and the second bearing ring form the inner ring and outer ring, wherein this assignment may differ in accordance with the respective requirements.

If the second bearing ring is provided as an outer ring, the groove is correspondingly open in the inward radial direction toward the axis of rotation. By contrast, if the second bearing ring forms the inner ring, the groove is correspondingly open in the outward radial direction away from the axis of rotation.

The first bearing ring has a lobe which engages into the groove, wherein, between the lobe and the groove, there are arranged a radial bearing row and two axial bearing rows which are spaced apart in the axial direction. The first radial bearing row is situated on a radially encircling tip of the lobe, wherein the cylindrical rollers as rolling bodies of the first radial bearing row may also be inserted into the lobe in order to further minimize the space requirement of the cylindrical roller bearing in a radial direction.

The two axial bearing rows which are spaced apart in the axial direction and which have cylindrical rollers are arranged on lateral flanks of the lobe. The first radial bearing row supports the first bearing ring in a first radial direction against the second bearing ring, wherein also, a second radial bearing row with cylindrical rollers is provided which supports the first bearing ring relative to the second bearing ring in a second radial direction which is opposite to the first radial direction. According to the invention, the first bearing ring is divided, in the axial direction, into at least one first ring part with the lobe and a second ring part, wherein the second radial bearing row is arranged, with an axial spacing to the lobe, between the second ring part and the second bearing ring.

By contrast to the three-row cylindrical roller bearings known from the prior art (DE 30 34 008 C2), the first bearing ring and the second bearing ring are supported against one another in the inward and outward radial directions, such that different deformation is prevented. By contrast to the situation in the generic EP 2 092 204 B1, the two radial bearing rows, which impart opposite radial support, are not arranged in the direct vicinity of one another on the same formation in the form of a lobe, but are arranged with an axial spacing on different ring parts. In this way, the installation space required in the radial direction can be considerably reduced. Furthermore, it is also readily possible for the first bearing ring and the second bearing ring to be provided with passage holes which permit simple attachment of the cylindrical roller bearing to the parts that are to be rotatably connected to one another.

In a preferred refinement of the invention, it is provided that the second ring part and the second bearing ring each have a projection, wherein the projections engage behind one another in the axial direction and in the radial direction, and wherein the second radial bearing row is arranged between the projections. In particular, it may be provided that the projections each have an L-shape with a radial limb and a free axial limb. In order that the projections can then, by way of their free limbs, engage over one another in the axial direction and in the radial direction, a groove which is open in the axial direction is expediently provided on the respectively complementary bearing ring.

According to the invention, the first bearing ring with the lobe is divided, in the axial direction, into at least two ring parts. It is normally also the case that the second bearing ring is divided in the axial direction in the region of the groove, in order that the lobe can be positioned in the groove and in order to permit the installation of the cylindrical rollers arranged around the lobe. It is also basically possible for the first bearing ring and the second bearing ring to have more than in each case two ring parts arranged in succession in the axial direction, in order to permit, for example, the arrangement of more than two axial bearing rows. A refinement with more than two axial bearing rows (cf. DE 10 2011 000 769 A1) is also possible within the scope of the invention.

In a preferred refinement, in the case of an at least two-part form of the first bearing ring, it is provided that the second ring part forms, in the axial direction, a face surface of the cylindrical roller bearing. It is then the case that, during the assembly process, the second ring part is mounted in the axial direction onto the first ring part and inserted by way of its projection into an associated depression or into an axially open groove on the face surface of the second bearing ring, wherein the cylindrical rollers of the second radial bearing row should be arranged therein beforehand.

By virtue of the fact that the second radial bearing row is arranged with an axial spacing to the lobe, it is possible, as already discussed above, to realize a compact design. In particular, it may be provided that the second bearing row does not project in the radial direction beyond the region in which the axial bearing rows and the first axial bearing row are arranged. It is particularly, preferably provided that the second radial bearing row does not project in the radial direction beyond the axial bearing rows. Accordingly, in a sectional illustration in the radial direction, the second radial bearing row is arranged above or below the axial bearing rows. It is thus the case that, in the radial direction, there is no additional space requirement for the arrangement of the second radial row. Here, it must be taken into consideration that, in many applications, an elongation of the cylindrical roller bearing in an axial direction is readily possible, whereas a design which is as compact as possible in the radial direction is advantageous.

Since the space requirement for the arrangement of the axial bearing rows and radial bearing rows in the radial direction is minimized, the first bearing ring and/or the second bearing ring may each have, distributed around the circumference, passage holes for fastening screws.

As already discussed above, the first bearing ring may form an inner ring or an outer ring, wherein then, the second bearing ring correspondingly forms the associated outer ring or inner ring. Furthermore, the first bearing ring or the second bearing ring may have radial supply ducts for lubricant. In general, it is adequate for only one of the two bearing rings to be provided with corresponding supply ducts, wherein a supply of lubricant from the inside or from the outside may be selected in the individual case in a manner dependent on accessibility.

Finally, it is also possible for one of the two bearing rings or both bearing rings to be equipped with a toothing over the entire circumference or over a part of the circumference.

The present disclosure will be discussed in further detail below with reference to the attached drawing figures.

FIG. 1 shows a cylindrical roller bearing according to the invention for absorbing axial and radial forces, said cylindrical roller bearing being provided in particular as a blade adjustment bearing on a wind turbine, for the purpose of connecting the individual blades, so as to be rotatable about a blade longitudinal axis, to a rotor.

The cylindrical roller bearing has a first bearing ring 1 and a second bearing ring 2, which are arranged concentrically about an axis of rotation running in the axial direction x.

In the exemplary embodiment of FIG. 1, the first bearing ring 1 forms an inner ring and the second bearing ring 2 forms an outer ring, wherein a reversed assignment of the first bearing ring 1 and of the second bearing ring 2 is possible without restriction.

The second bearing ring 2 has a groove 3 which is open in a radial direction. In the embodiment as per FIG. 1, in which the second bearing ring 2 forms the outer ring, the groove 3 is open in the inward radial direction toward the axis of rotation. A lobe 4 of the first bearing ring 1 engages into the groove 3 of the second bearing ring 2. Between the lobe 4 and the groove 3 there is arranged a first radial bearing row 5 with cylindrical rollers 6a. The cylindrical rollers 6a are in this case arranged in a further depression of the groove 3. Alternatively, a corresponding depression may also be provided in the lobe 4 (cf. FIG. 3). Finally, a combination is also possible, in which in each case one depression of relatively small height is provided both in the lobe 4 and in the region of the groove 3.

Two axial bearing rows 7 with cylindrical rollers 6b are arranged, with an axial spacing to one another, on the lateral flanks of the lobe 4, wherein the first radial bearing row 5 supports the first bearing ring 1, as inner ring, outwardly in a first radial direction against the second bearing ring 2, as outer ring.

According to the invention, a second radial bearing row 8 which has cylindrical rollers 6c and which acts in the opposite direction is provided with an axial spacing to the lobe 4. Whereas the first bearing ring 1, as inner ring, is delimited in the event of a deformation by the first radial bearing row 5, the second radial bearing row 8 has the effect that the first bearing ring also cannot be regionally separated in an inward direction from the second bearing ring 2 as outer ring.

The first bearing ring 1 is divided in the axial direction into a first ring part 1a with the lobe 4 and a second ring part 1b, wherein the second radial bearing row 8 is arranged on the second ring part 1b of the first bearing ring 1. The second ring part 1b and the second bearing ring 2 each have an L-shaped projection 9, 9', wherein free ends of the projections 9, 9' engage behind one another both in the axial direction x and in the radial direction, and form an intermediate space for the cylindrical rollers 6c of the second bearing row 8. By means of the second bearing row 8, the first bearing ring 1, which in the embodiment as per FIG. 1 forms the inner bearing ring, is thus supported in the inward radial direction R against the second bearing ring 2. Owing to the dual radial support in opposite directions, the two bearing rings 1, 2 cannot deform in uncontrolled fashion. In particular, the problem of so-called ovalization, whereby the two bearing rings 1, 2 are bent differently and lose their circular shape, can thereby be eliminated.

FIG. 1 also shows that the second bearing ring 2 is also divided in the axial direction X into two parts in order to permit the arrangement of the first radial bearing row 5 and of the two axial bearing rows 7 in the region of the lobe 4. In this case, the second bearing ring 2 is divided in the region of the groove 3, wherein a division outside a raceway of the cylindrical rollers 6a of the first radial bearing row 5 is however expediently provided.

The cylindrical rollers 6a, 6b, 6c of the first bearing row 5, the axial bearing rows 7 and the second radial bearing row 8 are guided, in the conventional manner, in cages. Furthermore, supply ducts 10 for lubricant are indicated in FIG. 1. The supply ducts 10 are illustrated by way of example in the second bearing ring 2, wherein it is basically also possible for the first bearing ring 1 or both bearing rings 1, 2 to be provided with supply ducts 10, in a manner dependent on accessibility.

It can be seen from FIG. 1 that the second radial bearing row 8 is arranged above the two axial bearing rows 7 and does not project in the radial direction beyond the extent of the two axial bearing rows 7. The space requirement in the radial direction can thereby be minimized.

Furthermore, it is also possible for the two bearing rings 1, 2 to be provided with passage holes 11, 11' which permit the fastening of the two parts which are to be rotatably connected to one another.

Figure 2:
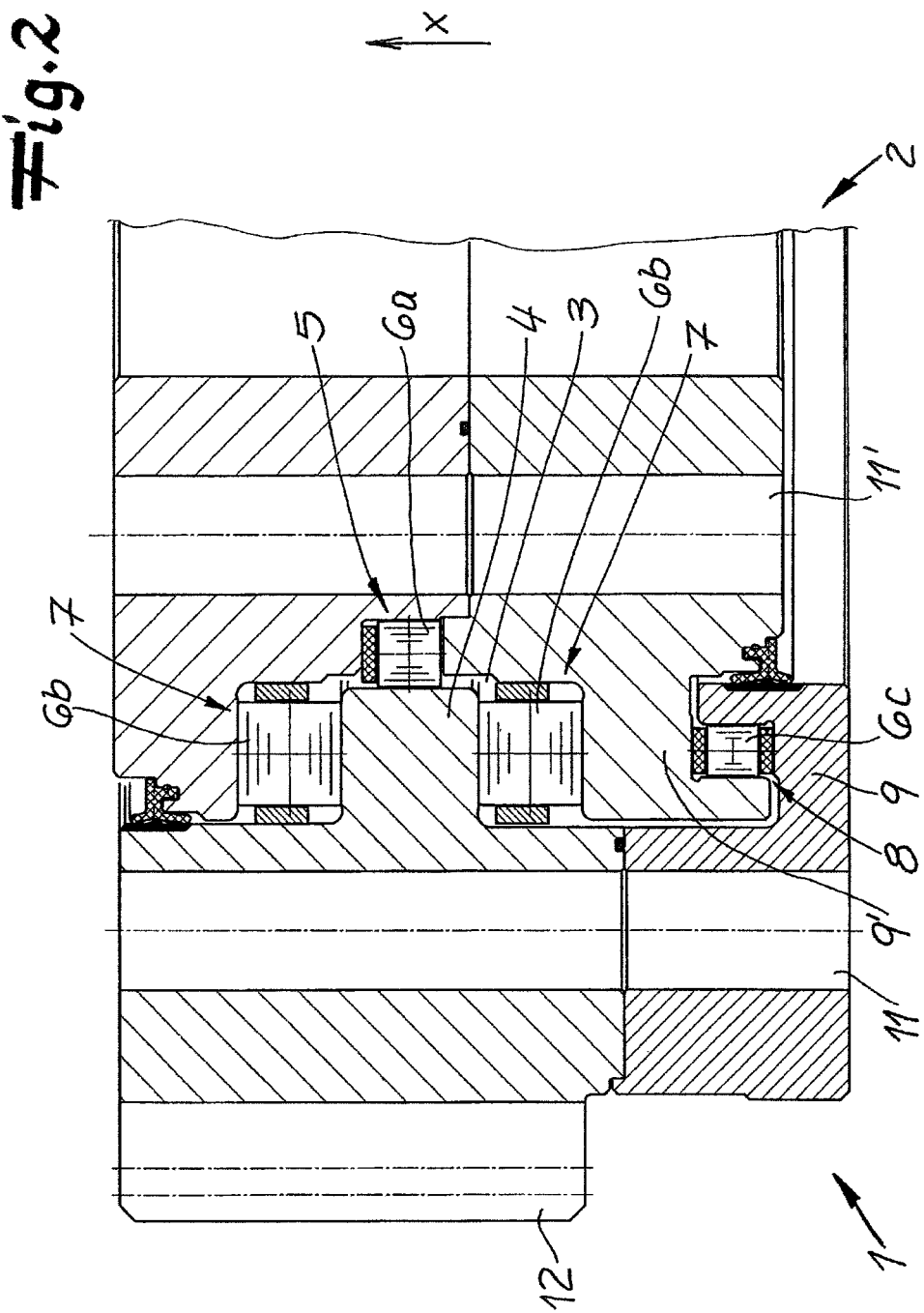
FIG. 2 is a partial cross section view of an alternate embodiment of a cylindrical roller bearing of the present disclosure.

FIG. 2 shows an alternative refinement of the cylindrical roller bearing, which corresponds in terms of its basic construction to the refinement of FIG. 1. A difference lies in the fact that the first bearing ring 1 forms the outer ring and the second bearing ring 2 forms the inner ring. It can additionally be seen that a toothing 12 is provided on the first bearing ring 1 as outer ring. A corresponding toothing may additionally or alternatively also be provided on the second bearing ring 2.

Figure 3:
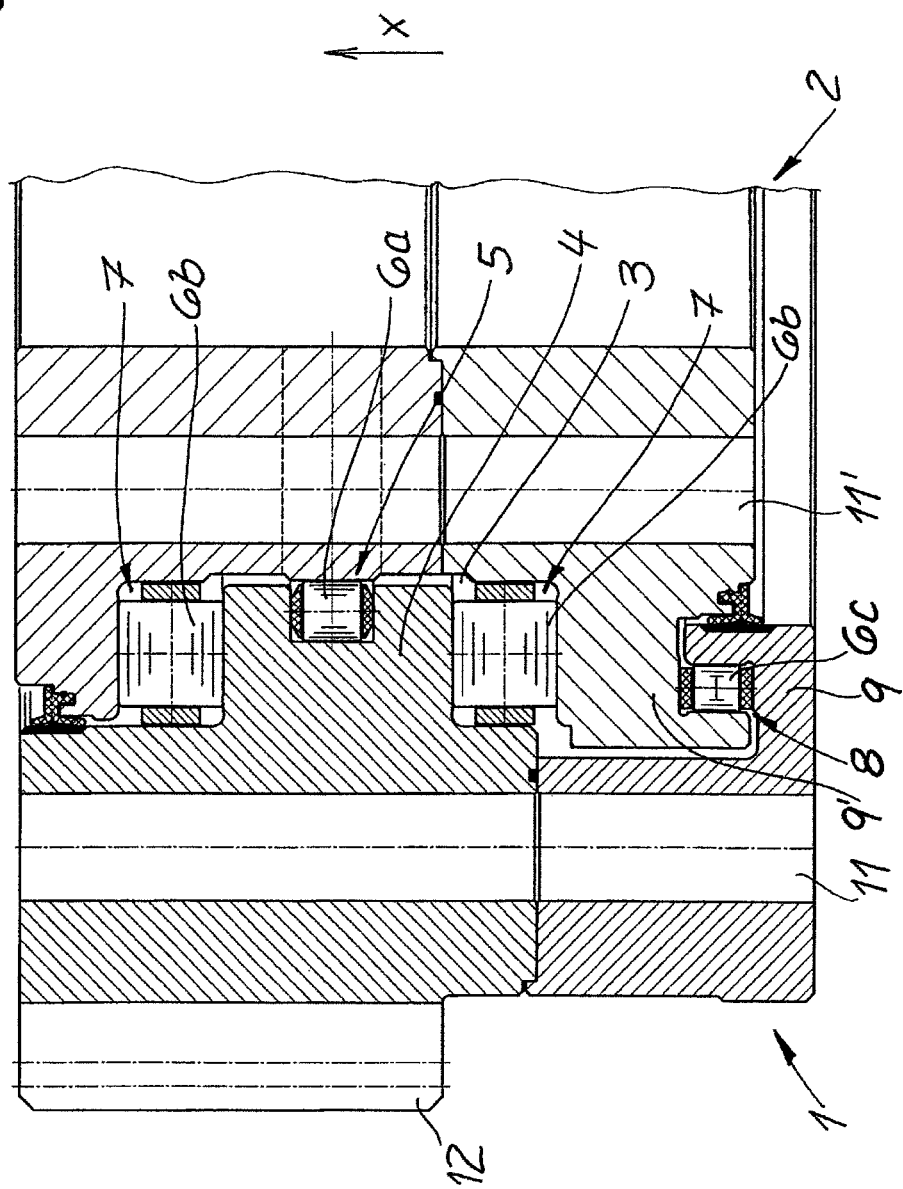
FIG. 3 is a partial cross section view of an alternate embodiment of a cylindrical roller bearing of the present disclosure.

The refinement of FIG. 3 differs from the refinement as per FIG. 2 in that the cylindrical rollers 6a of the first radial bearing row 5 are inserted into a depression of the lobe 4, such that the space requirement for the cylindrical roller bearing in the radial direction is yet further reduced.

The invention claimed is:

1. A cylindrical roller bearing for absorbing axial and radial forces, comprising:
   a first bearing ring having an axis of rotation running in an axial direction (x), said first bearing ring being divided, in the axial direction, into at least one first ring part having a lobe protruding therefrom, and a second ring part disposed adjacent said first ring part;
   a second bearing ring concentrically disposed about an outer periphery of said first bearing ring, said second bearing ring having a groove defined therein that is open in a radial direction and into which groove said lobe of said first bearing ring is positioned;
   a first axial bearing row and a second axial bearing row, each disposed between said lobe of said first bearing ring and said groove of said second bearing ring, said first and second axial bearing rows being spaced apart from each other in the axial direction;
   a first radial bearing row disposed between said lobe of said first bearing ring and said groove of said second bearing ring, said first radial bearing row being configured to support said first bearing ring against said second bearing ring in a first radial direction; and
   a second radial bearing row that is,
      disposed between said second ring part of said first bearing ring and said second bearing ring,
      disposed either above or below said first and second axial bearing rows so that it does not project in the radial direction beyond said first and second axial bearing rows, and
      spaced axially apart from said lobe,
   said second radial bearing row being configured to support said first bearing ring against said second bearing ring in a second radial direction that is opposite said first radial direction.

2. The cylindrical roller bearing of claim 1, wherein said second ring part and said second bearing ring each have a projection that respectively engage behind one another in the axial direction (x) and in the radial direction, and wherein said second radial bearing row is arranged between said respective projections of said second ring part and said second bearing ring.

3. The cylindrical roller bearing of claim 2, wherein said respective projections of said second ring part and said second bearing ring each have an L-shape with a radial limb and a free axial limb.

4. The cylindrical roller bearing of claim 1, comprising a face surface defined, in the axial direction (x), by said second ring part.

5. The cylindrical roller bearing of claim 1, wherein said second radial bearing row does not project in the radial direction beyond the region in which said axial bearing rows and said first radial bearing row are arranged.

6. The cylindrical roller bearing of claim 5, wherein said second radial bearing row does not project in the radial direction beyond said axial bearing rows.

7. The cylindrical roller bearing of claim 1, wherein said second bearing ring is divided in the axial direction (x) in a region of the groove.

8. The cylindrical roller bearing of claim 1, wherein said first bearing ring and said second bearing ring each have, distributed around a circumference thereof, passage holes for fastening screws.

9. The cylindrical roller bearing of claim 1, wherein said first bearing ring forms an inner ring and said second bearing ring forms an outer ring.

10. The cylindrical roller bearing of claim 1, wherein at least one of said first bearing ring or said second bearing ring have radial supply ducts for lubricant.

\* \* \* \* \*